United States Patent
Rich

(10) Patent No.: US 9,475,512 B2
(45) Date of Patent: Oct. 25, 2016

(54) LADDER CARRIER

(71) Applicant: Christian Stacy Rich, Kings Beach, CA (US)

(72) Inventor: Christian Stacy Rich, Kings Beach, CA (US)

(*) Notice: Subject to any disclaimer, the term of this patent is extended or adjusted under 35 U.S.C. 154(b) by 81 days.

(21) Appl. No.: 13/888,829

(22) Filed: May 7, 2013

(65) Prior Publication Data

US 2014/0332485 A1    Nov. 13, 2014

(51) Int. Cl.
| | |
|---|---|
| *B62B 1/26* | (2006.01) |
| *B62B 1/00* | (2006.01) |
| *B62B 1/14* | (2006.01) |
| *B62B 1/22* | (2006.01) |
| *E06C 7/00* | (2006.01) |

(52) U.S. Cl.
CPC ............... *B62B 1/262* (2013.01); *B62B 1/008* (2013.01); *B62B 1/14* (2013.01); *B62B 1/22* (2013.01); *E06C 7/00* (2013.01)

(58) Field of Classification Search
CPC ............ B62B 1/02; B62B 1/06; B62B 1/14; B62B 2202/401; B62B 2202/403; B62B 1/10; B62B 1/262; B62B 1/22; B62B 1/008; B60P 3/40; E06C 7/00
USPC ................. 211/85.8, 60.1; 280/47.17, 47.19, 280/47.331, 47.35, 63, 4, 47.24, 79.7; 180/19.2
See application file for complete search history.

(56) References Cited

U.S. PATENT DOCUMENTS

| | | | | |
|---|---|---|---|---|
| 2,662,777 | A * | 12/1953 | Wilchek .................... 280/47.24 |
| 3,603,608 | A * | 9/1971 | Kirkpatrick .............. 280/47.131 |
| 3,610,431 | A * | 10/1971 | Rodden ........................ 211/207 |
| 3,731,947 | A * | 5/1973 | Fontaine ....................... 280/641 |
| 4,009,762 | A * | 3/1977 | Bjerkgard ....................... 182/20 |
| 4,049,283 | A * | 9/1977 | Brookes et al. ......... 280/47.131 |
| 4,822,065 | A * | 4/1989 | Enders ..................... 280/47.331 |
| 4,896,730 | A * | 1/1990 | Jarrett et al. .................... 172/40 |
| 5,037,118 | A * | 8/1991 | Straube ........................ 280/79.6 |
| 5,181,731 | A * | 1/1993 | Gustavsen ............... 280/47.131 |
| 5,476,352 | A * | 12/1995 | Culbertson et al. ............. 414/23 |
| 5,727,799 | A * | 3/1998 | DiSario ........................ 280/47.3 |
| 5,806,868 | A * | 9/1998 | Collins ........................ 280/79.6 |
| 6,022,032 | A * | 2/2000 | Savage ....................... 280/47.24 |
| 6,109,644 | A * | 8/2000 | Cox ............................... 280/652 |
| 6,116,533 | A * | 9/2000 | Elder ......................... 242/594.4 |
| 6,209,681 | B1 * | 4/2001 | DiSario ........................... 182/20 |
| 6,234,499 | B1 * | 5/2001 | Irwin et al. ..................... 280/63 |
| 6,270,094 | B1 * | 8/2001 | Campbell ................... 280/47.19 |
| 6,550,791 | B2 * | 4/2003 | Ramsey ..................... 280/47.19 |
| 6,557,882 | B2 * | 5/2003 | Harrington ................ 280/415.1 |
| 6,708,993 | B2 * | 3/2004 | Feik ................................ 280/63 |
| 6,896,273 | B2 * | 5/2005 | Forsberg et al. .......... 280/79.11 |
| 7,017,939 | B2 * | 3/2006 | Darling, III ............ B62B 1/002 280/47.18 |
| 7,017,940 | B2 * | 3/2006 | Hatfull ........................... 280/652 |
| 7,448,632 | B1 * | 11/2008 | Nieto ......................... 280/47.24 |
| 7,484,594 | B1 * | 2/2009 | Feliciano et al. ............. 182/127 |
| 7,600,764 | B1 * | 10/2009 | Parker ..................... 280/47.131 |

(Continued)

*Primary Examiner* — Stanton L Krycinski
(74) *Attorney, Agent, or Firm* — J. Carl Cooper

(57) ABSTRACT

A ladder carrier is disclosed herein. The ladder carrier includes a pair of pneumatic tires that are connected to each other through an axle. The ladder carrier further includes a support frame that is mounted on the axle. The support frame may include two bars that may be configured to hold at least one ladder such that center of gravity of the at least one ladder is supported by the pair of pneumatic tires. Further, the ladder carrier includes a base structure that may be connected between the two bars. The base structure may be connected to the two bars at a portion above the axle. The base structure may provide a platform for supporting the at least one ladder.

23 Claims, 4 Drawing Sheets

(56) References Cited

U.S. PATENT DOCUMENTS

| | | | |
|---|---|---|---|
| 8,251,379 B2* | 8/2012 | Watzke | 280/35 |
| 8,465,031 B2* | 6/2013 | Coghill, Jr. | 280/79.3 |
| 8,556,277 B1* | 10/2013 | Bolinski | 280/47.131 |
| 8,733,766 B2* | 5/2014 | Nieman | 280/47.17 |
| 8,746,377 B1* | 6/2014 | Dunbar | 180/19.2 |
| 2006/0194898 A1* | 8/2006 | Sanda, Jr. | B29C 73/163 523/166 |

* cited by examiner

LADDER CARRIER

FIELD OF INVENTION

The invention disclosed herein generally relates to carriers and, more specifically, to ladder carriers configured to carry one or multiple ladders at one time.

BACKGROUND

Houses with very high windows and chimneys generally require long ladders. These ladders are typically carried around by individuals at jobs e.g. washing windows, cleaning chimneys or cleaning roofs and gutters. Individuals carry the ladders and loads either in hands or by using other means. Carriers such as hand trucks, dollies, wheeled carts, and wagons are also known for carrying ladders. These carriers may also be used for moving, lifting, and supporting the loads in various physical tasks. Numerous designs have been utilized over the years for individual hand trucks, dolly, and step ladder devices. Moreover, the carriers have been combined into a single device.

Many people prefer to do things on their own whereas others prefer to hire professionals. For example, people working on homes often require a stepladder or extension ladder to facilitate their tasks. Apart from the ladders, such people may require tools, power cables, boxes of materials, painting, cleaning and other supplies and the like, during the course of the tasks. Further, when people are working on sites outside homes they may require tools for ease of work. For example, people work in various types of conditions and on various ground types including uneven, sandy, rocky, muddy, slippery, brush covered and sometimes snow and ice covered ground and steep slopes and various combinations thereof. In such cases, to bring the required equipment to a desired location, these people may need to carry out multiple trips even by using the dolly or other devices.

BRIEF DESCRIPTION OF FIGURES

The following detailed description of embodiments of the invention will be better understood when read in conjunction with the accompanying drawings. For the purpose of illustrating the invention, there is shown in the drawings, embodiments which are presently preferred. In the drawings, the left-most digit(s) of a reference number indicates the drawing in which the reference number first appears. The same reference numbers have been used throughout the drawings to indicate similar elements of the drawings.

DETAILED DESCRIPTION

Figure 1A:
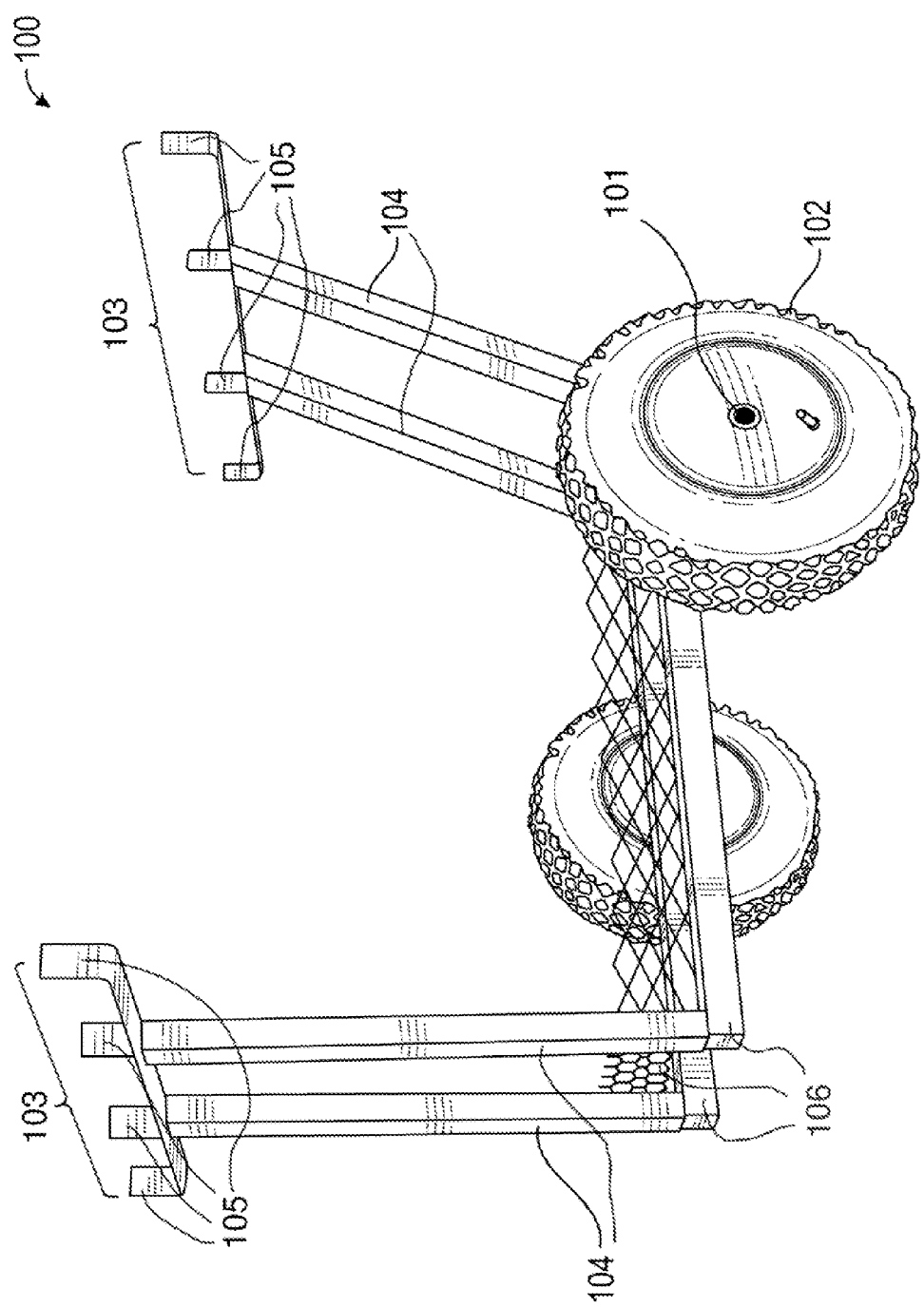
FIG. 1A illustrates a perspective view of a ladder carrier, in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated preferred embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide a ladder carrier that is capable of carrying single or multiple ladders and other tools at the same time.

Detailed embodiments of the invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the invention in virtually any appropriately detailed structure. Further, the terms and phrases used herein are not intended to be limiting, but rather to provide an understandable description of the invention.

Typically, people residing in houses with very high windows and chimneys require long ladders for reaching out to the windows and chimneys. Apart from the ladders, various other tools and supplies may also be required by people. These tools may be carried from one place to another by means of carriers, such as hand trucks, dolly, and step ladders. These carriers may also be used for moving, lifting, and supporting the loads in various physical tasks. Numerous designs have been utilized over the years for individual carriers. Moreover, more than one carrier may be combined into a single device to form a combination device. However, these combination devices generally fail in providing complete functional embodiments of the respective individual devices. Further, combining multiple functionalities into a single device is difficult as some features and/or functionalities of the individual devices may get lost in the combination.

Further, at times people prefer to do things on their own. For example, people working on homes often require not only a stepladder or extension ladder to facilitate their tasks, but may also require tools, power cables, boxes of materials, painting, cleaning and other supplies and the like, during the course of the tasks. When a ladder along with tools or materials are needed on the same job site or in the same area of a job site, two or more trips are required to bring the various equipments to the location where they are needed. Such trips may be tiring and time consuming for people.

Moreover, when people are working on sites outside homes. For example, people work in various types of conditions and on various ground types including uneven, sandy, rocky, muddy, slippery, brush covered and sometimes snow and ice covered ground and steep slopes and combinations. In such cases, carrying out multiple trips even by using a dolly, wagon, cart or other prior art device may be difficult and tiring.

Therefore, there exists a need for a ladder carrier that may be capable of carrying single or multiple ladders at the same time. There also exists a need for a ladder carrier that may be capable of carrying tools and other items along with the ladders. Further, there exists a need for a ladder carrier that may be carried over different terrains without any inconvenience.

The terms "a" or "an," as used herein, are defined as one or more than one. The term "another," as used herein, is defined as at least a second or more. The terms "including" and/or "having", as used herein, are defined as comprising (i.e., open transition). The term "coupled" or "operatively coupled," as used herein, is defined as connected, although not necessarily directly and/or mechanically.

In various embodiments of the specification, a ladder carrier is disclosed. The ladder carrier is preferred to include a pair of pneumatic tires that are preferred to be connected to each other by means of an axle. The preferred pair of pneumatic tires may facilitate in carrying the ladder carrier over different terrains, such as heavily wooded areas, stairs, various terrain and long distances. As may be understood, the pair of pneumatic tires may negotiate the air pressure as may be required in the different terrain areas. The pneumatic tires may be individually rotatable. The ladder carrier is preferred to further include a support frame for the ladder that may be mounted on the axle. The support frame is preferred to include two bars that are preferred to be configured one fore and one aft of the axle to hold at least one ladder such that centre of gravity (CG) of the at least one ladder is supported by the pair of pneumatic tires in a manner such that a person balancing the ladder on said pair of tires is only required to supply a force of 10% or less of the weight of the ladder, upward or downward depending of the relative position of the CG relative to the axle.

Further, the ladder carrier may include a base structure that may be connected between the two bars. The base structure is connected to the two bars at a location above the axle. The base structure may provide a platform disposed at the lower portion of the two bars for supporting the at least one ladder. In another embodiment, the ladder carrier may include a tool holder, such as a box, a platform, and a cage, that may be disposed at a surface below the base structure. The tool holder may be configured to carry tools, such as a circular saw and electric drill therein. Further, the support bar(s) of the ladder carrier may be configured in such a fashion that the ladder position may be adjusted for keeping the CG close to the axle. This may facilitate in propelling the ladder carrier with one hand by pushing or pulling at or near the end of the ladder.

Figure 1B:
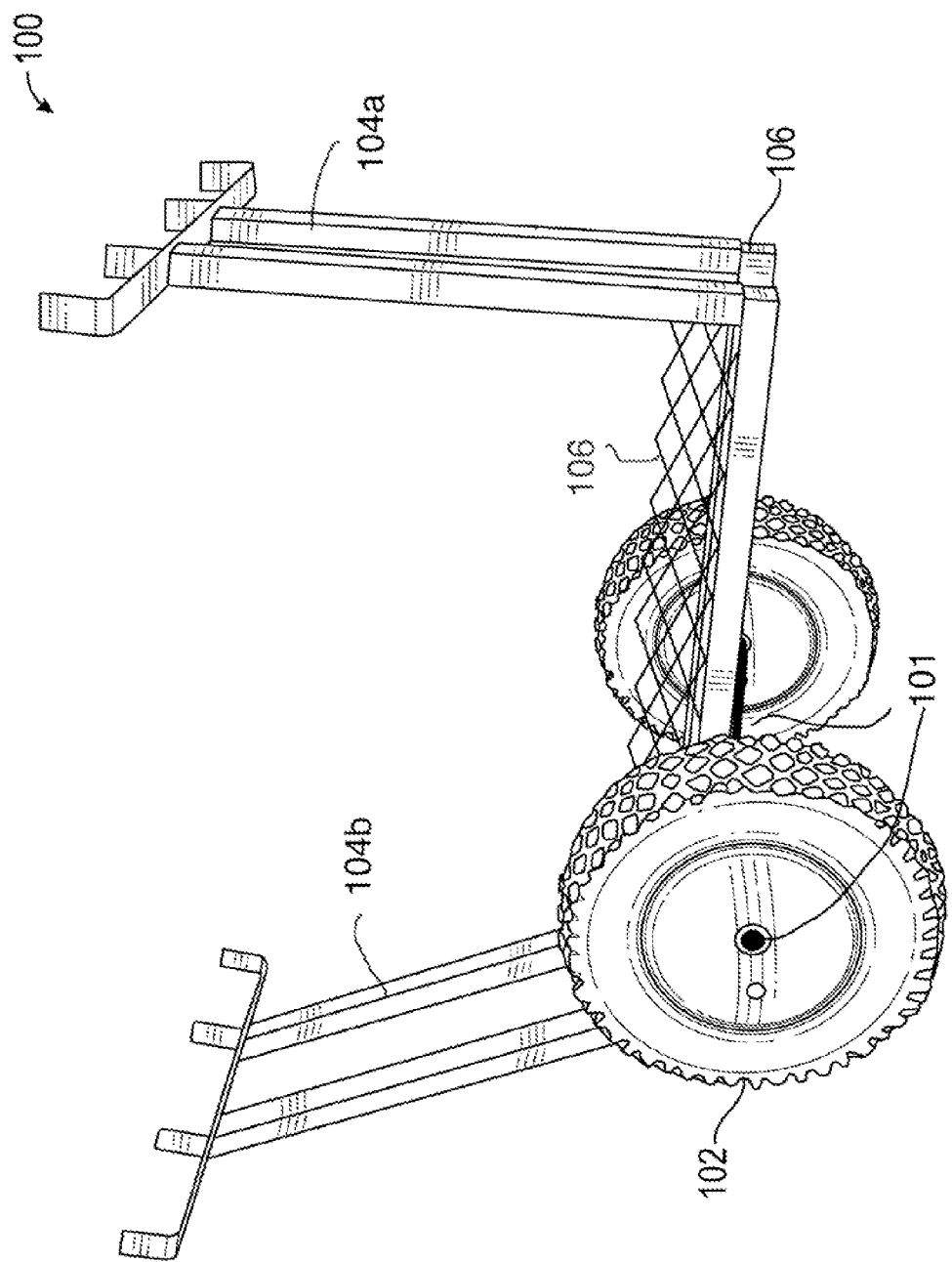
FIG. 1B illustrates another perspective view of the ladder carrier, in accordance with an embodiment of the present invention.

FIGS. 1A and 1B illustrate different perspective views of a ladder carrier 100, in accordance with the preferred embodiment of the present invention. The ladder carrier 100 may include an axle 101, a pair of pneumatic tires 102, a support frame 104 including preferred base structure and lower platform 106, upper platform 103, and ladder hooks 105. The pneumatic tires may be configured to provide support to the ladder carrier 100 and in particular are chosen to have a width, diameter, and inflation which provide desirable load carrying ability and ease of operation over a variety of site conditions along with protection of ground cover. In an implementation, the pair of pneumatic tires may be tubeless and may have a size of each of the tires may be 4.10/3.50-6. Further, the pair of pneumatic tires may be separated by an axle 101 having a length of about 22 inches and a diameter of about 2 inches. Preferably, the diameter of the axle 101 may be one and ¼ inches and may be solid or tubular.

The pair of pneumatic tires facilitate in carrying the ladder carrier 100 over different surfaces, such as plains, woods, rough surfaces, sand, rocks, gravel, snow, ice, and the like. The pneumatic tires may be configured to carry weight up to 320 lbs. Furthermore, pressure in each of the tire may be 30 psi. It will be evident to a person skilled in the art that the pressure in the pneumatic tires may be varied based on the requirements of various sites, the desired range of pressure being between 5 and 35 psi. For example, lower pressures are preferred for soft ground conditions and/or minimal impact on ground cover with higher pressures being preferred for harder and rocky conditions.

The support frame 104 may be coupled to the axle in a manner as to allow a ladder to act as a handle for maneuvering the ladder carrier 100. In an implementation, the support frame 104 may be connected to the axle by welding it via its base 106. In an implementation, the support frame 104 may be connected to the axle by means of nut and bolt, such as U bolts with regular hex nuts or if preferred hand or finger operable nuts e.g. wing or knurled nuts. This may facilitate dismantling the ladder carrier 100 during shipping and/or transport. The support frame 104 may be supported on the axle by means of washers that may facilitate in adjusting the support frame 104. The support frame 104 may include two bars 104a and 104b shown e.g. in FIG. 1B configured in the aforementioned positions fore and aft of the axle and configured to hold at least one ladder (ladder not shown) such that the center of gravity of the at least one ladder is supported by the pair of pneumatic tires 102 and allowing easy movement of the ladder and carrier by use of the ladder as a handle with minimal pressure required by the operator to balance and move the combination. The two bars may be made up of solid steel that may be of ¼ and ¼ inches cross section.

Further, the two bars 104a and 104b are preferred to be configured in such a way that the support frame 104 may include 90 degree bends at its base 106. In an alternative to the 90 degree bends where 104a meets 106, the support frame 104 is preferred to include 60 degree bends for bars, e.g. where 104b meets 106. The two bars may be square in cross section, however, it will be evident to a person skilled in the art that the shape of the two bars may be tubular in shape with a round, oval, square or rectangular cross section and having a size differing from the preferred ¼×¼ inch if desired.

Further, the ladder carrier 100 is preferred to include the base structure 106 which is connected between the two bars 104a and 104b of the support frame 104. Specifically, the base structure 106 is provided at a portion above the axle, thereby providing a platform for supporting the at least one ladder. In an implementation, the base structure 106 may be made up of support frame bars 104 and include a wire mesh or other material with holes having mechanical strength to hold tools, supplies and the like while at the same time allows any spilled liquid such as water, solvent or paint to pass there through. In another implementation, the base structure 106 may be made up of a solid or perforated metal plate which will accomplish the aforementioned support and liquid passing features.

Figure 2A:
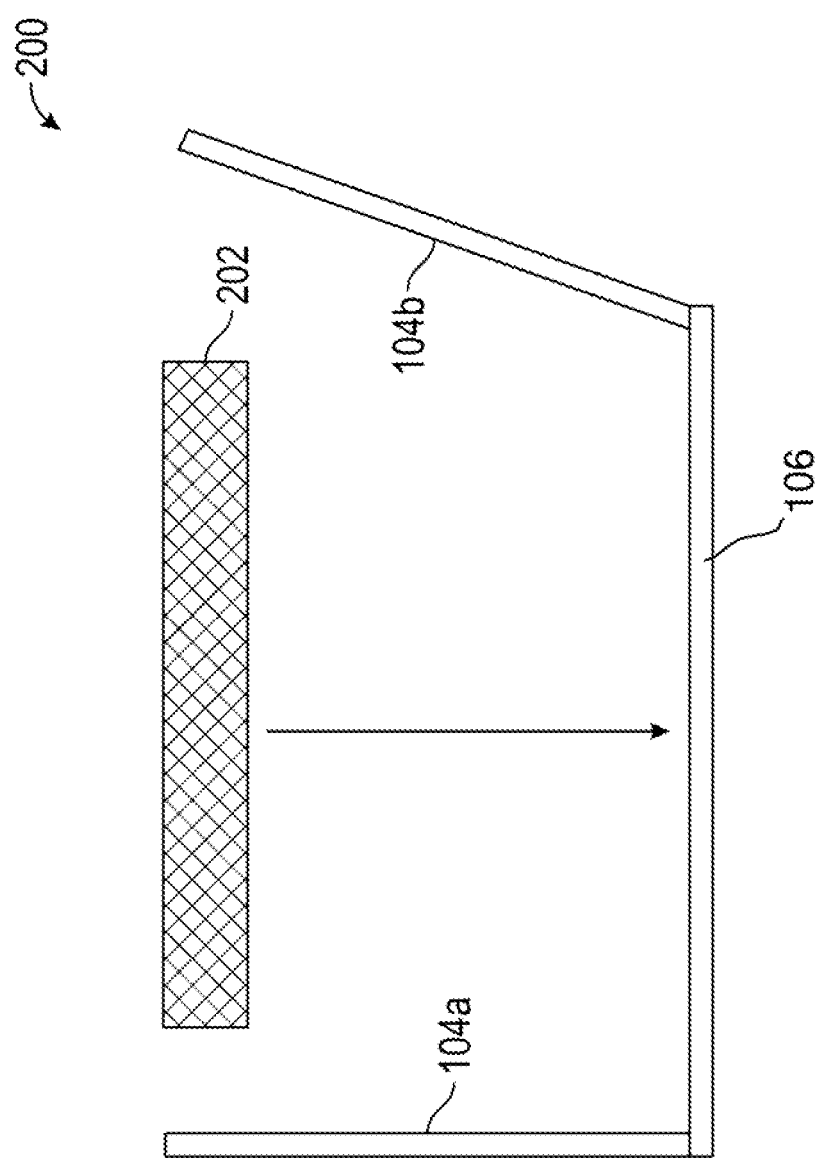
FIG. 2A illustrates a side view of a tool holder of the ladder carrier, in accordance with an embodiment of the present invention.

Further, as mentioned herein the tool holder 202 of FIG. 2A may be made up of high grade steel, e.g. high carbon, stainless, chrome-moly or other well-known alloy that may allow for heavy duty construction. The tool holder 202 may also be configured to be detachable from the ladder carrier 100. In an implementation, the ladder carrier 100 may carry two ladders that may be hooked on the first side or both sides by hooks 105 which are preferred to be part of the upper platform 103. For example, ladders with common extension may be coupled above the pair of pneumatic tires 102. Accordingly, this may provide a better center of gravity to carry any load that may be needed for a job. The ladder carrier 100 may be made up of a material that may be selected from aluminum, plastic, fiberglass, carbon fiber and the aforementioned steels. Examples of the plastic may include but are not limited to fiber filled polyvinyl chloride (PVC). The ladder carrier 100 as described herein is configured to achieve a desired level of performance, strength, durability and cost that the conventional ladder dollies do not provide. Further, the ladder carrier 100 provides sufficient ground clearance as it prevents problem associated with the end of the ladder dragging on the ground when used in a variety of sites and terrains. Examples of the problem which is avoided include navigating turns, obstacles and difficulties in maintaining balance. The height of the ladder carrier 100 may thereby facilitate in balancing more than one ladder.

Figure 2B:
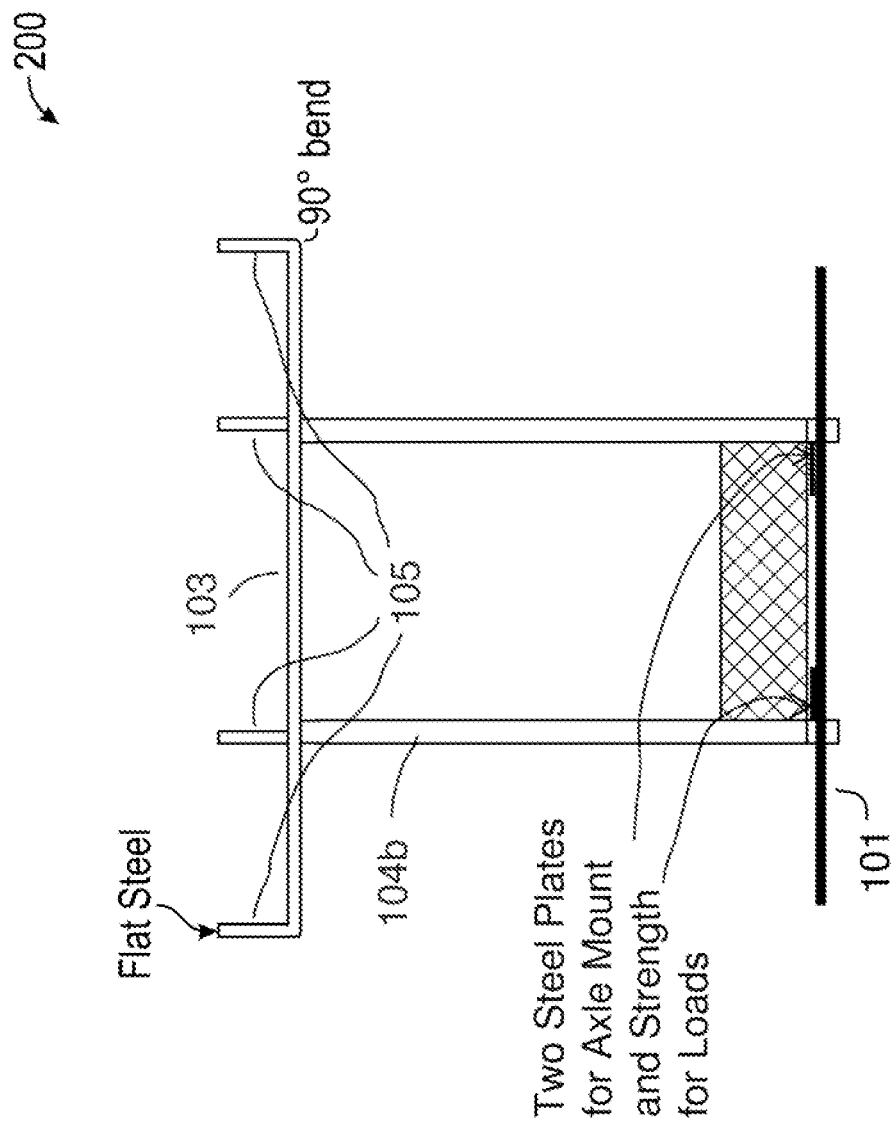
FIG. 2B illustrates the rear view of the tool holder of the ladder carrier, in accordance with an embodiment of the present invention.

FIGS. 2A and 2B illustrate side views of a tool holder 202 of the ladder carrier 100, in accordance with embodiments of the present invention. The tool holder 202 is preferred to be of the dimensions 23"L×8"W×14"T in accordance with commonly utilized tools, supplies and the like. The tool holder 202 may be configured to store at a side portion of the ladder carrier 100 e.g. separately from the wire mesh of base structure 106 or may be included in the support frame having two bars 204a, 204b. As is shown in FIG. 2A, one bar 104a is at an angle of 90 degrees with the base structure and another bar 104b is at an angle of 120 degrees (60 degrees measured on the other side of the angle) with respect to the plane of the base structure. As shown in FIG. 2A, the tool holder 202 is disposed at the 90 degree angle with respect to the bar 104a of ladder carrier 100. As mentioned herein above, the ladder carrier 100 may be configured to carry more than 300 lbs. of weight while at the same time being well suited for easy maneuvering by the operator. For example, the ladder carrier 100 may carry five commonly known and used ladders.

In an implementation, the tool holder 202 may be configured in the form of a tray that may be configured to store small hand tools, such as circular saw, electric drill, and tool bag. Apart from small hand tools, the tool holder 202 may also be used for hauling other things, such as construction and landscaping materials with or without a ladder and firewood, usually without a ladder. Further, as is illustrated in FIG. 2B, the axle may include two steel plates that may provide strength for loads carried by the ladder carrier 100. Moreover, the tool holder 202 may be made of wire mesh, perforated metal which may be expanded or a solid box having a drain in each end or each corner to facilitate cleaning sand, dirt and the like or the aforementioned passage of liquids.

The ladder carrier 100 as described herein may be conveniently used for cleaning chimneys and various other cleaning tasks. The tool holder 202 may provide small hand tools for windows as well as other types of maintenance, cleaning or repairs. In addition, the pair of pneumatic tires 102 may facilitate in transporting the ladder carrier 100 over a variety of ground types including uneven, sandy, rocky, muddy, slippery, brush covered, snow, ice covered ground, steep slopes, and combinations thereof.

It will be evident to a person skilled in the art that the invention may be embodied in other specific forms without departing from its spirit or essential characteristics. The described embodiments are to be considered in all respects only as illustrative and not restrictive. The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A ladder carrier comprising:
   a pair of pneumatic tires, each disposed on one side of the ladder carrier and connected to each other through an axle such that said pneumatic tires rest on a surface over which the ladder carrier may be propelled in front and rear directions on the surface perpendicular to the axle;
   a base structure comprised of two bars disposed between the pneumatic tires with each bar coupled to the axle with each bar extending in a straight line from the fore end of the respective bar at a point fore of the tires to the aft end of the respective bar at a point aft of the axle when the two bars are in a horizontal position;
   a support frame including the base structure wherein the support frame comprises an additional two upwardly disposed bars, a lower end of one of the upwardly disposed bars being disposed fore of the tires and coupled to the fore portion of a first one of the two bars of the base structure at substantially a right angle, and the lower end of the other of the two upwardly disposed bars being disposed aft of the axle and coupled to the aft portion of said first one of the two bars of the base structure, upper ends of the two upwardly disposed bars extending above the pneumatic tires; and
   said base structure configured to hold the at least one ladder such that the center of gravity of the at least one ladder is supported by the pair of pneumatic tires in a fashion that the ladder carrier can be propelled frontward or rearward with the pushing or pulling force applied by a single operator person holding directly by hand at or near an end of said at least one ladder such that the combination of the ladder and the ladder carrier is balanced by the operator person while being propelled.

2. The ladder carrier as claimed in claim 1, wherein said support frame comprises four upwardly disposed bars, including said two upwardly disposed bars plus two further upwardly disposed bars with the lower end of each of the two further upwardly disposed bar coupled to one of the fore or aft portions respectively of a second one of said two base frame bars, thereby providing two upward bars disposed fore of the tires and two disposed aft of the axle.

3. The ladder carrier as claimed in claim 2, wherein each of the pair of pneumatic tires is individually rotating.

4. The ladder carrier as claimed in claim 1, wherein the ladder carrier is made up of a material selected from high carbon steel, steel alloy, aluminum, plastic, fiber glass, and carbon fiber.

5. The ladder carrier as claimed in claim 1, wherein the support frame can hold said at least one ladder such that said at least one ladder acts as a handle for maneuvering the ladder carrier by the operator person's hand.

6. The ladder carrier as claimed in claim 1, wherein the support frame is connected to the axle with a nut and bolt.

7. The ladder carrier as claimed in claim 1, including a tool holder attached to said support frame and the tool holder comprises a platform or an open top box or cage and is made up of a wire mesh.

8. The ladder carrier as claimed in claim 1 further comprising a tool holder incorporated in the base structure disposed at a surface of the base structure, wherein the tool holder is configured in the form of a platform or an open top box or cage to carry tools and when the surface of the base structure is in a horizontal position the entire base structure is lower than the top of the pneumatic tires.

9. The ladder carrier as claimed in claim 8, wherein the tool holder is detachable.

10. The ladder carrier as claimed in claim 1 further comprising an upper platform disposed at the top of the support frame enabling the at least one ladder to be hooked at a side portion of the support frame.

11. The ladder carrier as claimed in claim 10, wherein the upper platform is configured to include a hook for holding the ladder at said side portion of the support frame.

12. The ladder carrier as claimed in claim 1, wherein the magnitude of the force applied by hand by the single operator person at or near the end of the ladder in order to balance the ladder on the pneumatic tires is at the most 10% of the weight of the ladder, and wherein the force is applied in an upward or downward direction.

13. An apparatus comprising:
a pair of tires each having a rim portion connected to each other through an axle wherein the tires are in contact with terrain and are individually rotating and inflated to a pressure between 5 and 35 psi that gives the apparatus the ability to be navigated by a person by hand over different kinds of the terrain;
a support frame coupled to the axle, wherein the support frame comprises four upwardly disposed bars, disposed two fore and two aft, with the upper ends of the four bars extending above the pneumatic tires and configured to hold one or more ladders such that the center of gravity of the one or more ladders is supported by the pair of tires with force applied directly by the hand of the operator person at or near an end of the one or more ladders such that the apparatus is thereby held in equilibrium; and
a base structure part of the support frame having fore and aft ends connected between the lower ends of the four bars at a portion of the fore and aft ends, which are vertically positioned above the vertical height of the axle, below the upper rim of the tires and outside the diameter of the rim when the base structure is in a horizontal position, wherein the base structure provides a platform for supporting the one or more ladders above the terrain.

14. The apparatus of claim 13, wherein the support frame holds the one or more ladders in a fashion that one ladder acts as a handle for maneuvering the apparatus over the terrain by the hand of the operator person.

15. The apparatus of claim 13, wherein the apparatus is configured such that when the apparatus is maneuvered over the terrain by the operator person, the clearance provided between the base structure and the terrain is sufficient to prevent the ends of the one or more ladders being carried from dragging on the terrain when the apparatus is used on terrain.

16. The apparatus of claim 13, wherein the support frame additionally comprises two cross bars, disposed at the upper ends of the upwardly disposed bars, parallel to the axle, one cross bar fore and one cross bar aft of the axle and each cross bar includes a hook for carrying the one or more ladders at the side of the support frame.

17. The apparatus of claim 13, wherein the apparatus includes a tool holder attached to the support frame disposed at a surface of the base structure, and wherein the tool holder has an open top and is configured to carry a plurality of tools.

18. The apparatus of claim 13, wherein the apparatus is configured to include a tray attached to the support frame to allow the apparatus to carry hand tools in addition to ladders.

19. The apparatus of claim 13, wherein the air pressure in the tires can be adjusted from 5 to 35 psi to facilitate the navigation of the apparatus over different terrain.

20. The apparatus of claim 13, wherein the apparatus is configured to be dismantled for shipping and/or transport.

21. The apparatus of claim 17, wherein said tool holder is detachable.

22. The apparatus of claim 18, wherein said tray is detachable.

23. The ladder carrier as claimed in claim 7, wherein the tool holder is detachable.

* * * * *